Jan. 18, 1955 — C. B. JOHNSON — 2,699,916
CLOSED BOTTOM SERVICE COCK
Filed March 11, 1949
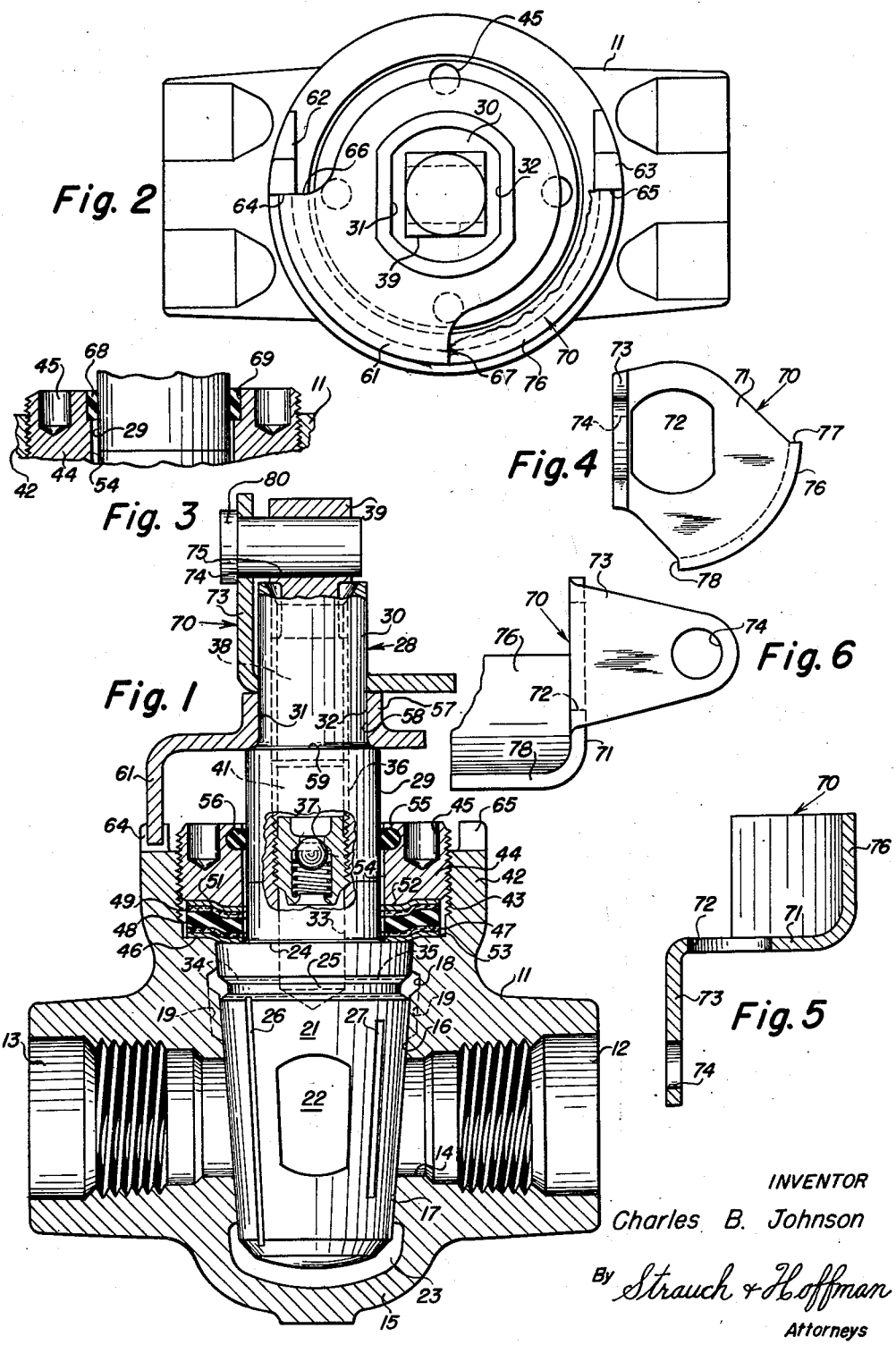
INVENTOR
Charles B. Johnson
By Strauch & Hoffman
Attorneys

United States Patent Office 2,699,916
Patented Jan. 18, 1955

2,699,916

CLOSED BOTTOM SERVICE COCK

Charles B. Johnson, Pittsburgh, Pa., assignor to Rockwell Manufacturing Company, Pittsburgh, Pa., a corporation of Pennsylvania Application March 11, 1949, Serial No. 80,969

5 Claims. (Cl. 251—188)

This invention relates to plug valves and is particularly concerned with novel sealing arrangements about the stem of a valve plug.

It is a major object of my invention to provide a closed bottom plug valve assembly wherein novel efficient sealing means is provided between the valve stem and the valve body and the parts are easily assembled and disassembled with a maximum of convenience and a minimum of time. The chief purpose of the seal is to restrain the entry of water, dirt and other corrosion forming substances through the space between the valve stem and the gland.

A still further object of this invention provides a specially formed gland unit for cooperation with a plug valve body, and coacting in a novel manner with a deformable seal to maintain the seal in positive engagement with the valve body and plug.

A still further object resides in the novel provision in a plug valve of a specially formed gland unit cooperating with a seal to retain and seal the plug within the valve body and coacting with a second sealing means surrounding the plug shaft to restrain entry of water, dirt and other corrosion forming substances through the space between the valve stem and the gland.

A further object of the invention is to provide a novel axially deformable seal between a plug valve stem and body wherein the seal is formed and shaped in place by tightening special holding means.

Further objects of the invention will appear as the description proceeds in conjunction with the appended claims and the annexed drawings wherein:

Figure 1 is a cross sectional view of a valve body and plug assembly illustrating details of a preferred embodiment of the invention;

Figure 2 is a top plan view of the plug valve assembly;

Figure 3 is a fragmentary section through the top of the gland that holds in the packing around the stem of the plug, wherein a different type of seal ring is used;

Figure 4 is a top plan view of the lock device associated with the stop collar;

Figure 5 is a section through the lock device of Figure 4; and

Figure 6 is an elevation of the lock device of Figure 4.

A plug valve body casting is formed at opposite sides with aligned inlet and outlet openings 12 and 13 communicating with a through port 14 to thereby provide a through passage through the valve body. The bottom of the valve body casing is closed by an integral dome-shaped wall 15.

A tapered valve seat bore comprising a machined upper frusto-conical valve seat portion 16 and a machined lower frusto-conical valve seat portion 17 is provided within the body with its normally vertical axis at right angles to the axis of flow through port 14. Seat portion 16 is formed with a continuous annular shallow surface groove 18 above port 14 but below the upper edge of seat portion 16. Four longitudinal dwarf grooves 19 spaced 90° apart are cut into the surface of the valve seat portion 16 with their upper ends opening into groove 18 and their lower ends terminating short of port 14. Grooves 18 and 19 provide the only interruptions to the surface of frusto-conical seat portion 16 which is otherwise smooth.

A frusto-conical valve plug 21 having a transverse port 22 adapted to align with the casing port 14, but shown in closed position in Figure 1, is rotatably mounted in the tapered bore provided by seats 16 and 17, and its lower end projects into a lubricant receiving chamber 23 provided by wall 15. The upper edge 24 of the plug 21 is preferably sharply cornered, and it must terminate a small distance below the upper edge of the valve seat 16 as illustrated in Figure 1.

Valve plug 21 is formed with a continuous annular surface groove 25 in constant communication with continuous seat groove 18, and the side surfaces of the valve plug are formed with 180 degree spaced pairs of longitudinal grooves 26 and 27. The pair of longer grooves 26 run the length of the plug surface and are diametrically opposite and located alongside the openings of port 22. Grooves 26 are in constant communication at all times at opposite ends with groove 25 and the chamber 23. The pair of shorter grooves 27 terminate short of the groove 25 at their upper ends and short of the lower edge of seat 17 at their lower ends, and when the valve plug is in the closed position of Figure 1 these grooves 27 are in communication with the lubricant circuit of the valve through two of the dwarf grooves 19. When the valve plug 21 has been turned to its 90° open position the short grooves 27 are in communication with groove 25 through the other pair of dwarf grooves 19.

Upstanding from plug 21 is an integral stem 28 which is formed above plug edge 24 with a cylindrical portion 29 adapted to be surrounded by a seal assembly to be described below, and above portion 29 the valve stem is formed with a reduced extension 30 having two parallel flat sides 31 and 32 as illustrated in Figure 2. Internally, stem 28 is formed with an axial bore 33 that extends into the plug below the level of groove 25, and passageways 34 and 35 are provided for connecting the bottom of bore 33 with groove 25 so as to provide for a constantly open lubricant passage from the stem bore to the external grooving of the plug.

Bore 33 extends the entire length of stem 28 and opens outwardly at the top of the latter. Bore 33 is threaded as at 36 to receive a removable check valve asembly 37, and above the check valve assembly a suitable lubricant screw 38 having an external large operating head 39 is mounted in threaded bore section 36. Between the check valve and the lower end of screw 38 is a reservoir chamber 41 that contains the lubricant which is usually introduced in stick form through the top of bore 33 and then forced down into and through suitable check valve 37 by inserting and turning down screw 38. Preferably check valve 37 is screwed into bore 33 from above until its threads jam and it is permanently fixed at the bottom of threaded bore section 36.

Lubricant forced down through the check valve assembly and bore 33 enters passages 34 and 35 into grooves 18 and 25 from which it spreads to form a continuous seal over the seating surface 16 on the valve. Lubricant is conducted by grooves 26 and 27 to lower seat 17 and chamber 23. When the valve is in either closed or open positions lubricant may pass under pressure down the grooves 26 to the chamber 23 so that, should the valve be frozen in such position, rotation of screw 38 will exert hydraulic pressure acting upwardly of the plug and sufficient to separate the plug from the seat to permit rotation. The groove and seat arrangement insures that port 22 at opposite ends is surrounded by continuous plastic sealing films of lubricant.

Upstanding from the valve body casing is an integral hollow boss 42 which is internally threaded at 43 for the reception of a metal gland 44 having suitable wrench holes 45. The inner diameter of gland 44 is slightly larger than the outside diameter of stem portion 29 so that these parts may be readily relatively rotated without binding.

Below gland 44 is an axially deformable sealing assembly made up of a stack of annular elements comprising in order, a sheet metal, preferably stainless steel, flat annular diaphragm 46 that seats on the valve body, a flat annular gasket 47 which is preferably of asbestos or some similar composition that is resistant to acids and the fluids and material likely to be encountered in operation of the valve, a somewhat more compressible and thicker annular rubber or like resilient gasket 48, a second asbestos or like composition gasket 49 and another sheet metal annular diaphragm 51 similar to diaphragm 46. The lower end of annular gland 44 is formed near its inner periphery with an annular axially depending projecting rim 52 which engages upper metal diaphragm 51 and functions in the assembly to uniformly axially deform the inner part of the seal stack when gland 44 is drawn tight as illustrated in Figure 2, to thereby provide tight engagement of the inner portion of the flexible seal assembly provided by the stack of washers but one which readily permits relative rotation of the valve plug in the body. The gland 44 thereby shapes and conforms the seal assembly to the joint to be sealed and provides equal sealing pressure all around the plug top which aids in properly seating the plug in its bore. The outer peripheral portion of the seal stack is squeezed tightly and immovably between gland 44 and the body ledge 53 whereby a tight leak proof seal is provided at this point. By providing an axially flexible seal, I eliminate any need to align the flat plug and body surfaces at 24 and 53.

In order to prevent ingress of water, dirt and other undesirable substances between the valve stem and the inner cylindrical periphery 54 of gland 44, I form the gland surface 54 near its upper end with a continuous annular recess 55 which is substantially cylindrical in cross section but of a depth slightly less than its diameter for the reception of a sealing member that preferably comprises a deformable and resilient, preferably synthetic oil-resistant rubber, O-ring 56 that is cylindrical in undeformed cross section. The inner diameter of the undeformed O-ring 56 is just enough smaller than valve stem portion 29 that it will fit over and slide along cylindrical portion 29 while being slightly radially deformed thereby with the result that its inner side is substantially flattened against cylindrical surface portion 29 of the valve stem. This engagement of the O-ring with the valve stem will not interfere with longitudinal movement of the gland as the latter is tightened against the seal stack, and the gland to stem seal is preserved during tightening of the gland. In assembling the valve, with the plug seated, it is only necessary to drop the seal stack in place and tighten up gland 44. The thickness of the seal stack prevents axial binding of the plug.

A stop collar element 57, which is preferably an inexpensive sheet metal stamping with its bore 58 formed to be press fitted over the flat-sided reduced portion 30 of the valve stem and to seat at its lower end on the shoulder 59 provided between the valve stem portions 29 and 30, is formed with a depending flange 61 which has an extent circumferentially equal to about 90 degrees as illustrated in Figure 2. The upper edge of boss 42 is formed with integral projections 62 and 63 formed with radial faces 64 and 65 respectively adapted to be contacted by either of faces 66 or 67 respectively at opposite ends of the flange 61 and thereby serve as positive stops limiting rotation of the valve plug between 90 degree displaced fully open and fully closed positions. It is an important part of the assembly of the invention that the gland 44 may be tightened or removed without disturbing collar 57.

Figures 4, 5 and 6 illustrate a preferred locking device 70 that may be used to seal the valve plug in open or closed position. This device is preferably an inexpensive sheet metal stamping having a transverse web 71 formed with an aperture 72 adapted to be non-rotatably slip fitted onto upper stem portion 30 above collar 57, an upstanding integral ear 73 apertured at 74 for alignment with a hole 75 in the head of screw 38, and a depending integral skirt 76 having radial stop faces 77 and 78 90° apart.

Once the valve is assembled it may be locked in the Figure 2 position by slipping locking device 70 over the valve stem down onto the top of collar 57 and so that faces 77 and 78 are disposed between stop faces 65 and 67. A suitable locking device such as seal plug 80 is passed through apertures 74 and 75 which are then in alignment, and the valve cannot be operated without breaking the seal. The valve can be locked and sealed in open position by removing the seal plug and device 70, turning the plug, slipping the device 70 onto the valve stem with faces 77 and 78 between stop faces 64 and 66 and providing a new seal plug in apertures 74 and 75. An important result of this construction is that the lubricant screw 38 is locked when the valve is locked, to prevent unauthorized tampering.

A further embodiment of the invention is illustrated in Figure 3 where, instead of the O-ring and groove assembly, I may employ a different type of seal between the inner periphery 54 of gland 44 and the cylindrical surface of valve stem portion 29. Here, a flat resilient collar 68 of rubber or some other suitable material is seated in a shouldered recess 69 formed in the upper inner periphery of gland 44.

I have therefore provided a novel lubricated plug valve assembly wherein the valve stem is tightly sealed against the ingress of water, dirt, etc. and against the egress of lubricant or line fluid under pressure, particularly along the valve stem, and the parts are readily disassembled and assembled without deforming the sealing members or destroying them, so that they can readily be used over and over again.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve assembly, a valve body having a through passage for fluid intersected by a bore for receiving a rotatable plug, a valve stem projecting from the plug through said body, an annular axially and radially deformable seal assembly surrounding said stem with its inner peripheral region seating on said plug and its outer peripheral region seating on said body, a gland directly mounted on said body surrounding said valve stem for adjustment axially of said valve stem adapted to tightly grip the outer peripheral region of said seal between the gland and said body, and an annular rib of uniform height extending around and integral with the seal contacting face of said gland inwardly of said outer peripheral region for axially deforming said inner peripheral region of said seal into substantially uniform pressure sliding contact with the upper end of the plug in the assembly.

2. In a plug valve assembly, a valve body having a through passage for fluid intersected by a bore for receiving a rotatable valve plug, a valve stem projecting from the plug through said body, an annular deformable seal assembly surrounding said stem with its inner peripheral region seating on said plug below the top of said bore and its outer peripheral region seating on said body, an annular boss integral with said body surrounding said stem beyond the bore, a gland surrounding said stem adjustably threaded in said boss and adapted to seat on said seal, an annular formation on the inner peripheral portion of the bottom of and integral with said gland projecting axially into continuous annular contact with the inner peripheral region of said seal to urge it into substantially uniform sliding bearing contact with the top of said plug, the outer peripheral region of said seal being tightly gripped between the outer peripheral portion of the bottom of said gland and the body, and said annular formation shaping said seal according to the joint between the plug and body as the gland is tightened, and means compressed between the gland and the valve stem for sealing the space between said stem and the gland against entry of water and dirt regardless of the adjusted position of the gland on the body.

3. In a plug valve assembly, a valve body having a through passage for fluid intersected by a bore for receiving a rotatable valve plug, said body having an opening and an integral annular boss surrounding said opening, a stem on the valve plug projecting through said boss, a shelf at the bottom of said boss adjacent and above the top of said plug, an axially deformable annular seal seated on said shelf and extending over the top of said plug, a gland threaded into said boss for tightly gripping the outer part of the seal between the gland and shelf, an annular offset surface on the bottom of said gland axially projecting into contact with said seal for deflecting the inner part of the seal into substantially uniform bearing contact with the top of the plug over a continuous zone, and means between the gland and the valve stem for sealing against the ingress of water and dirt comprising a continuous recess in the internal surface of said gland, and a ring of resilient material seated in said recess and compressed between the gland and the valve stem.

4. In a plug valve assembly, a valve body having a through passage intersected by a bore receiving a rotatable valve plug, a valve plug rotatable in said bore and formed with a valve stem projecting externally of the body, a hollow boss projecting from said casing in surrounding relation to said valve stem, a stack of axially deformable sealing elements seated at the bottom of said boss, a gland rotatably and axially adjustable in said boss and having its lower end in contact with said stack of sealing elements for tightly gripping the outer periphery of said stack between the gland and the body, an annular rib integral with and projecting axially from the inner portion of the bottom of said gland into contact with the inner periphery of said stack and for deforming the inner peripheral portions of said stack of sealing elements into uniform sealing and wiping engagement with the top surface of the valve plug, and a continuous resilient annular sealing member mounted in an internal recess near the top of said gland compressed between said valve stem and the gland during all positions of adjustment of said gland.

5. In a plug valve assembly, a body having a through fluid passage intersected by a bore, a rotatable ported plug in said bore, a stem fixed to said plug and projecting through an aperture in said casing, an annular flat axially and radially deformable seal surrounding said stem at said aperture, an annular gland surrounding said stem axially adjustably mounted directly on said body and having a radially planar surface adapted to clamp the outer periphery of said seal tight with the body and having integral therewith an axially projecting annular rib inwardly of said planar surface and constituting an offset radially planar surface contacting said seal and deforming its inner periphery into substantially uniform bearing contact with plug, said seal and gland having free running clearances with said valve stem, and a rubber O-ring compressed between the gland and valve stem axially outwardly of said seal.

References Cited in the file of this patent

UNITED STATES PATENTS

| Number | Name | Date |
|---|---|---|
| Re. 17,338 | Nordstrom | June 25, 1929 |
| 251,406 | Brooks | Dec. 27, 1881 |
| 684,399 | Ashley | Oct. 15, 1901 |
| 1,293,753 | Gibson | Feb. 11, 1919 |
| 1,964,782 | Bard | July 3, 1934 |
| 2,100,470 | Cotton | Nov. 30, 1937 |
| 2,118,232 | Roberts | May 24, 1938 |
| 2,147,851 | Mallon | Feb. 21, 1939 |
| 2,173,381 | Waddell | Sept. 19, 1939 |
| 2,206,370 | Scherer | July 2, 1940 |
| 2,229,120 | Nordstrom | Jan. 21, 1941 |
| 2,282,488 | MacClatchie | May 12, 1942 |
| 2,510,494 | Bowan et al. | June 6, 1950 |

FOREIGN PATENTS

| Number | Country | Date |
|---|---|---|
| 885,448 | France | Sept. 14, 1943 |